UNITED STATES PATENT OFFICE.

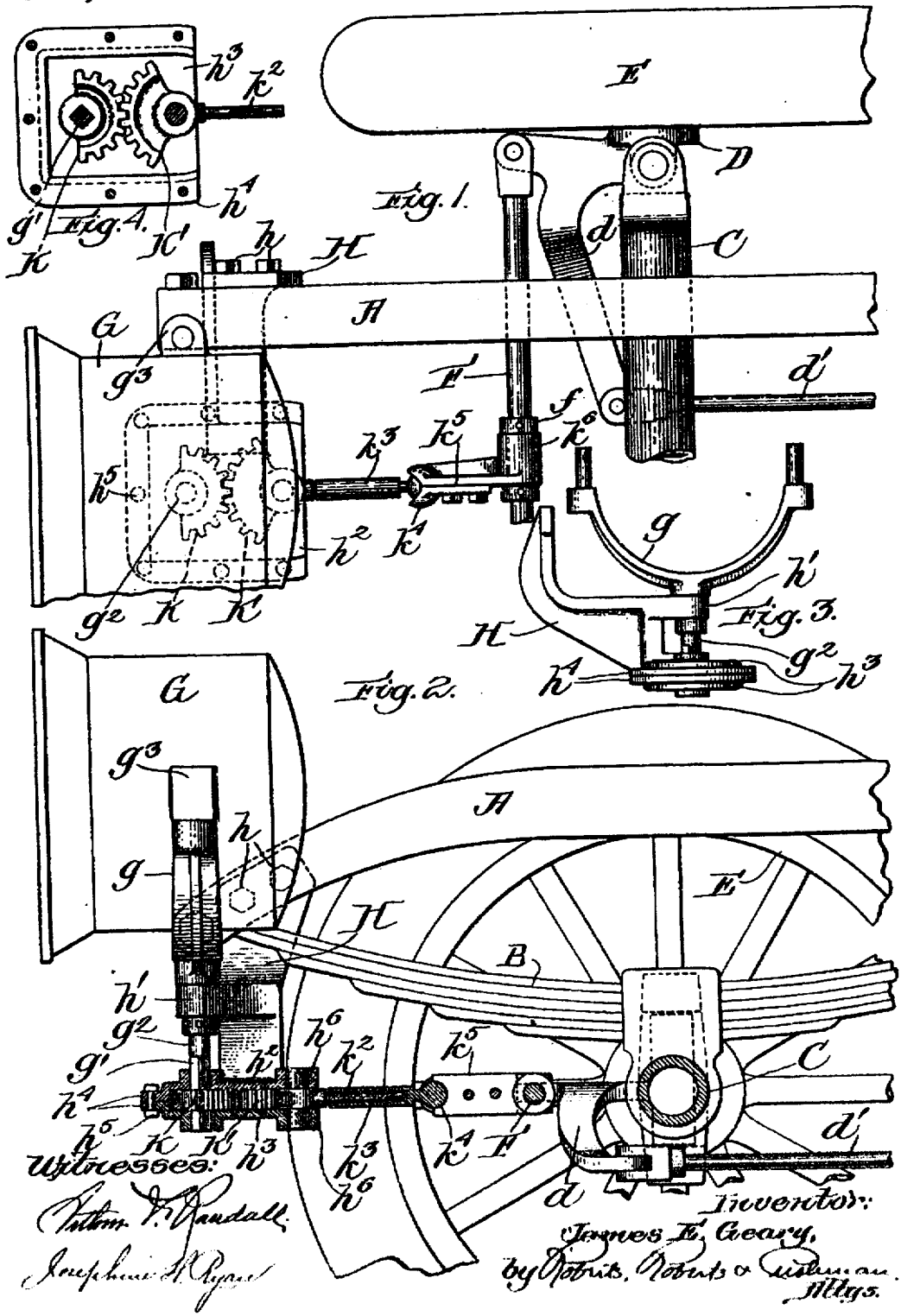

JAMES E. GEARY, OF QUINCY, MASSACHUSETTS.

SWIVEL-LAMP FOR VEHICLES.

945,122.
Specification of Letters Patent.
Patented Jan. 4, 1910.

Application filed April 7, 1909. Serial No. 488,518.

*To all whom it may concern:*

Be it known that I, JAMES E. GEARY, a citizen of the United States, and resident of Quincy, in the county of Norfolk and State of Massachusetts, have invented new and useful Improvements in Swivel-Lamps for Vehicles, of which the following is a specification.

This invention relates to swivel lamps for vehicles, and its object is to provide means for automatically causing the lamps or headlight of the vehicle to turn or swing in the same direction with the wheels when the latter are turned or swung on their pivoted journals, thus throwing the light at all times in the direction in which the car is going.

The invention consists primarily in mounting the lamp on a vertical axis, or a substantially vertical axis, so that when the lamp is turned the zone of light shall fall in the direction of the travel of the vehicle, and connecting said swivel lamp with some member which moves in unison with the pivoted wheels, such as the steering apparatus or the pivoted wheel journals, in such manner as to cause the swivel lamp automatically to turn or swing in the same direction with the wheels when the latter are swung on their pivoted journals.

The lamp is preferably mounted on a pivoted post having its axis on the vehicle body or vehicle frame; and the mechanism for actuating the lamp is preferably connected directly or indirectly with the pivoted wheel journals, between which and the body of the car a spring is usually interposed; the connection between the swivel lamp and the pivoted wheel journals when thus arranged, is therefore made extensible and flexible to allow for the relative movement between the vehicle body carrying the lamp and the wheel journals.

Other features will hereinafter be described and particularly pointed out in the claims.

The invention is applicable to all kinds of vehicles in which the wheels are mounted on journals pivoted to turn or swing with relation to the vehicle body, when the direction of travel of the vehicle is changed, such as automobiles or electric railway cars having swivel trucks or other forms of pivoted wheel journals.

The use of the invention in an automobile is sufficiently characteristic of its operation, and admirably illustrates the invention and will, I believe, constitute one of its most useful applications. I will therefore address my description to an embodiment of the invention adapted to an automobile. It will be understood, however, that the invention is not limited to use in connection with automobiles, but is applicable to vehicles generally, and such general application is contemplated by the claims.

In the accompanying drawings which show one embodiment illustrating the invention,—Figure 1 is a plan view of a swivel lamp and mechanism for actuating the same, showing so much of a motor car as is necessary to illustrate the invention; Fig. 2 is a side elevation, partly in section, of the parts shown in Fig. 1; Fig. 3 is a detail view, in front elevation, of a bracket for supporting the swivel lamp and certain parts of the actuating mechanism; and Fig. 4 is a detail view showing in plan the lower part of the gear casing, and the gear segments presently to be described.

Referring to the drawings, A represents the forward end of one of the lengthwise extending side members of the frame of a motor car; the body (not shown) is carried by the frame; B represents one of the forward springs; C, the forward axle; D, the knuckle pivotally mounted at the end of the axle having a lever arm $d$ to which is pivotally connected the rod $d'$ actuated by the steering wheel (not shown); E, one of the front wheels mounted on a journal carried by the pivoted knuckle; and F, the steering rod extending transversely of the car and pivotally connected at its ends to the pivoted knuckles D to cause them to turn together. The parts thus far mentioned may be of a construction usual in motor cars and a more extended or detailed description will not here be necessary.

The lamp G which may be of usual construction, is mounted on a forked support $g$ carried by vertical post $g^2$. Lugs $g^3$ on the lamp engage the ends of the forked support $g$. The lower end of the post $g^2$ is made rectangular in cross section, as shown at $g'$, to engage a rectangular aperture in the gear segment presently to be described. Mounted on the forward end of the frame member A is a bracket H secured to the side of the frame member A by bolts $h$. The bracket H extends downward from the frame member A and is provided with the laterally extending lugs $h'$ in which the post $g^2$ is pivoted, and also with the laterally extending plate $h^2$, below the lug $h'$, which forms the top wall of a gear casing. The bottom of the gear casing consists of a similar plate shown at $h^3$. Both plates $h^2$ and $h^3$ are dished somewhat and provided with marginal flanges $h^4$, so that the two plates when placed together as shown form between them a chamber, and may be fastened together by bolts $h^5$ passing through the flanges $h^4$. Within the chamber of the gear casing thus formed is a pair of gear segments K and K' in mesh with each other, and pivoted between the top and bottom plates of the gear casing. The gear segment K is mounted fast on the rectangular end of post $g^2$, which extends downward into the gear casing, so that when the gear K is turned on its axis it will turn the post and the lamp carried thereby. The gear segment K' which is pivoted in hubs $h^6$, is provided with a rearwardly extending lever secured thereto for turning said gear segment, the lever as herein shown being a telescoping lever and consisting of a rod $k^2$ secured to the gear segment K', and the sleeve $k^3$ mounted to slide lengthwise on rod $k^2$. Connected with the end of this telescoping lever by some form of universal joint, such as the ball and socket joint $k^4$, is an arm $k^5$ carried by the steering rod F. The arm $k^5$ is provided with a sleeve $k^6$ surrounding the rod F, so that it may swing in a vertical plane to allow for the relative movement between the running gear carrying the arm $k^5$ and the car body carrying the lamp and the rest of the lamp actuating connection. At each side of the sleeve $k^6$ is a collar $f$ fast to the rod F to carry the arm $k^5$ bodily to the right or left with the movement of the rod F.

The operation of the device will be apparent from the foregoing description. When the wheels of the car are turned on their pivoted journals, the rod F is moved endwise in the same direction, and, acting through arm $k^5$, lever $k^3$, $k^2$ gear segments K' and K, and post $g^2$, turns the lamp in the same direction with the wheels. The telescoping lever $k^2$, $k^3$, lengthens or shortens as the rod F moves either laterally of the car body when the wheels of the car are turned, or vertically with relation to the car body by reason of the yielding of the springs, in either case varying the distance between the sleeve $k^6$ and the pivot of gear segment K'. In order that the lamp G may be swung to substantially the same angular position with relation to the vehicle body as the wheels when the latter are turned, the lengths of the lever arms, and the sizes of the gears K and K' are so proportioned as to accomplish that end.

I claim:

1. In combination, a vehicle having wheels mounted on journals pivoted to turn with relation to the vehicle body, a steering rod movable transversely of the vehicle body connected with said pivoted wheel journals, a swivel lamp carried by a post, said post being pivotally mounted on the vehicle in a substantially vertical axis, a gear segment fast to said post, a second gear segment in mesh with the first gear segment, an extensible telescoping lever secured to said second gear segment, and a lever actuating arm secured to said steering rod and movable therewith, said extensible lever and said arm being connected by a universal joint.

2. In combination, a vehicle having wheels mounted on journals pivoted to turn with relation to the vehicle body, a steering rod movable transversely of the vehicle body connected with said pivoted wheel journals, a swivel lamp carried by a post, said post being pivotally mounted on the vehicle in a substantially vertical axis, a gear segment fast to said post, a second gear segment in mesh with the first gear segment, an extensible telescoping lever secured to said second gear segment, and a lever actuating arm pivoted to said steering rod to swing in a vertical plane only, said extensible lever and said arm being connected by a universal joint.

3. In combination, a vehicle having wheels mounted on journals pivoted to turn with relation to the vehicle body, a steering rod movable transversely of the vehicle body connected with said pivoted wheel journals, a swivel lamp carried by a post, said post being pivotally mounted on the vehicle in a substantially vertical axis, a gear segment fast to said post, a second gear segment in mesh with the first gear segment, an extensible telescoping lever secured to said second gear segment, and a lever actuating arm provided with a sleeve loosely fitting said steering rod, means to prevent said sleeve from moving lengthwise of said steering rod but to permit it to swing thereon in a vertical plane, said extensible lever and said arm being connected by a universal joint.

Signed by me at Rochester, New York this twenty ninth day of March, 1909.

JAMES E. GEARY.

Witnesses:
Robert Cushman,
Thos. J. Shortle.